(12) United States Patent
Schaefer

(10) Patent No.: US 10,082,392 B2
(45) Date of Patent: Sep. 25, 2018

(54) LEVEL DEVICE WITH INTER CHANGEABLE MODULES AND DIGITAL FEATURES

(71) Applicant: Brent Schaefer, Los Angeles, CA (US)

(72) Inventor: Brent Schaefer, Los Angeles, CA (US)

( * ) Notice: Subject to any disclaimer, the term of this patent is extended or adjusted under 35 U.S.C. 154(b) by 0 days.

(21) Appl. No.: 13/999,041

(22) Filed: Jan. 7, 2014

(65) Prior Publication Data
US 2016/0054124 A1 Feb. 25, 2016

(51) Int. Cl.
*G01C 9/32* (2006.01)
*G01C 9/28* (2006.01)

(52) U.S. Cl.
CPC ............ *G01C 9/32* (2013.01); *G01C 9/28* (2013.01)

(58) Field of Classification Search
CPC ........................................... G01C 9/32
USPC ............................................. 33/354
See application file for complete search history.

(56) References Cited

U.S. PATENT DOCUMENTS

| | | | | | |
|---|---|---|---|---|---|
| 2,535,791 | A | * | 12/1950 | Fluke | G01C 9/00 33/347 |
| 2,961,774 | A | * | 11/1960 | Dreier | G01C 9/28 33/381 |
| 3,832,782 | A | * | 9/1974 | Johnson | G01C 9/28 33/351 |
| 4,152,838 | A | * | 5/1979 | Cook | G01C 9/28 33/342 |
| 4,860,459 | A | * | 8/1989 | Dengler | G01C 9/28 33/379 |
| 5,177,873 | A | * | 1/1993 | Tate | G01C 9/28 33/385 |
| 5,459,935 | A | * | 10/1995 | Paulson | G01C 9/28 33/451 |
| 5,940,978 | A | * | 8/1999 | Wright | G01C 9/28 33/350 |
| 6,237,237 | B1 | * | 5/2001 | McKenna | G01C 9/28 33/374 |
| 6,675,490 | B1 | * | 1/2004 | Krehel | G01C 9/26 33/365 |
| 6,901,671 | B2 | * | 6/2005 | Lim | G01C 9/36 33/384 |
| 6,918,187 | B2 | * | 7/2005 | Schaefer | G01C 9/26 33/365 |
| 7,281,335 | B2 | * | 10/2007 | Feliciano | G01C 9/26 33/374 |
| 7,409,772 | B1 | * | 8/2008 | Morrissey | G01C 9/26 33/365 |
| 7,536,801 | B2 | * | 5/2009 | Zhang | G01C 15/008 33/286 |
| 8,046,929 | B2 | * | 11/2011 | Yowonske | G01C 9/26 33/374 |

(Continued)

*Primary Examiner* — Christopher Fulton
(74) *Attorney, Agent, or Firm* — Knobbe, Martens, Olson & Bear, LLP

(57) ABSTRACT

A level device in the present invention is described as having an elongated rigid frame with an X-shaped profile. The level device has modularly attachable levels, which include levels that can be rotated about the lengthwise axis of the level device, rotatable levels attached to the frame, circular surface levels attached to the frame, and levels guided by visual laser beams. Mechanical structures within the level device allow level modules to be swapped in and out based on user requirements. The level device has slide-able attachments which extend the footprint and measuring capabilities of the level.

33 Claims, 15 Drawing Sheets

(56) References Cited

U.S. PATENT DOCUMENTS

| | | | |
|---|---|---|---|
| 8,336,221 B2* | 12/2012 | Steele | G01C 9/28 33/354 |
| 8,661,698 B2* | 3/2014 | Kallabis | G01C 9/26 33/379 |
| 2002/0166249 A1* | 11/2002 | Liao | G01C 15/008 33/451 |
| 2003/0079357 A1* | 5/2003 | Liao | G01C 9/28 33/374 |
| 2006/0064888 A1* | 3/2006 | Chen | G01C 9/10 33/365 |

* cited by examiner

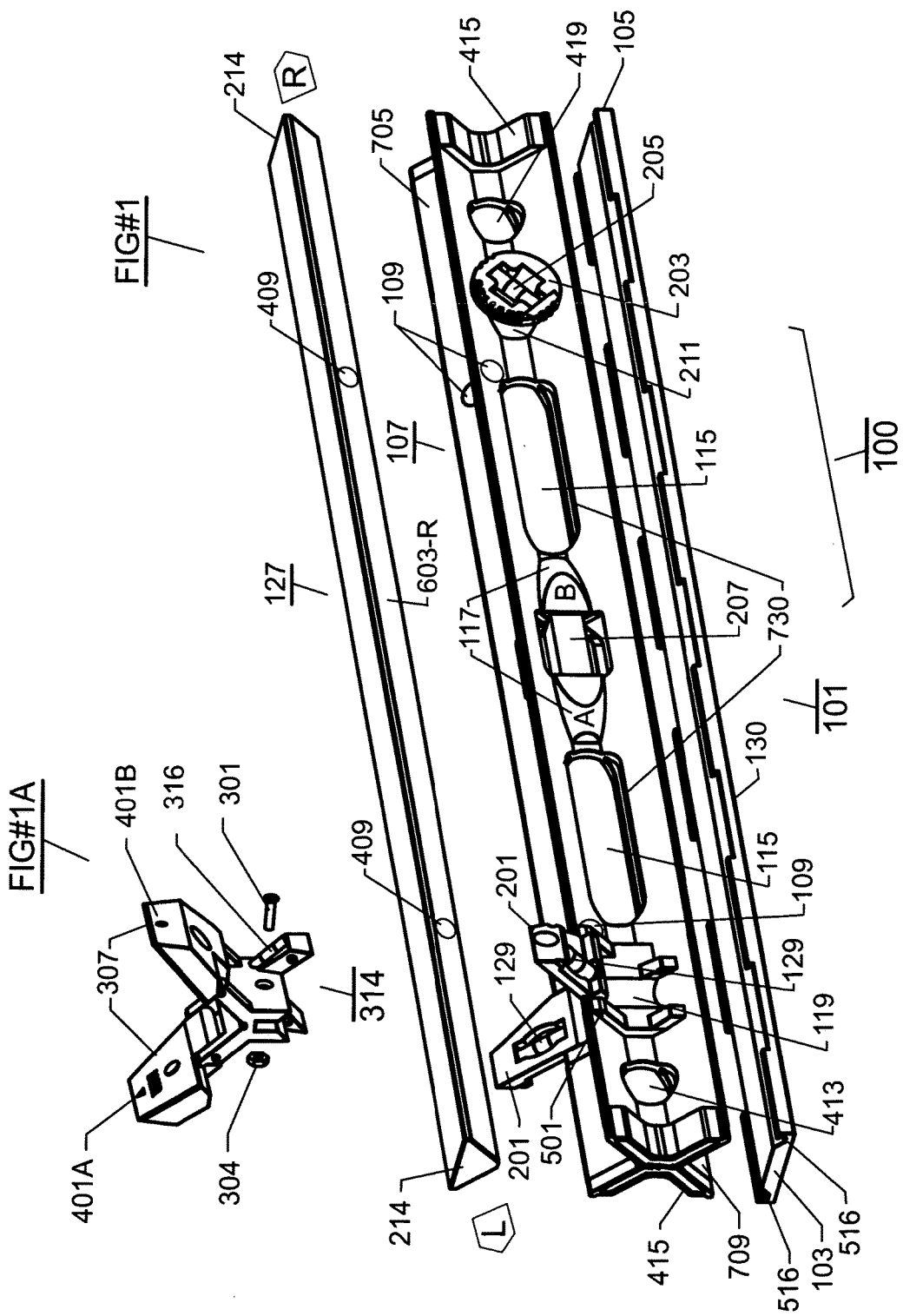

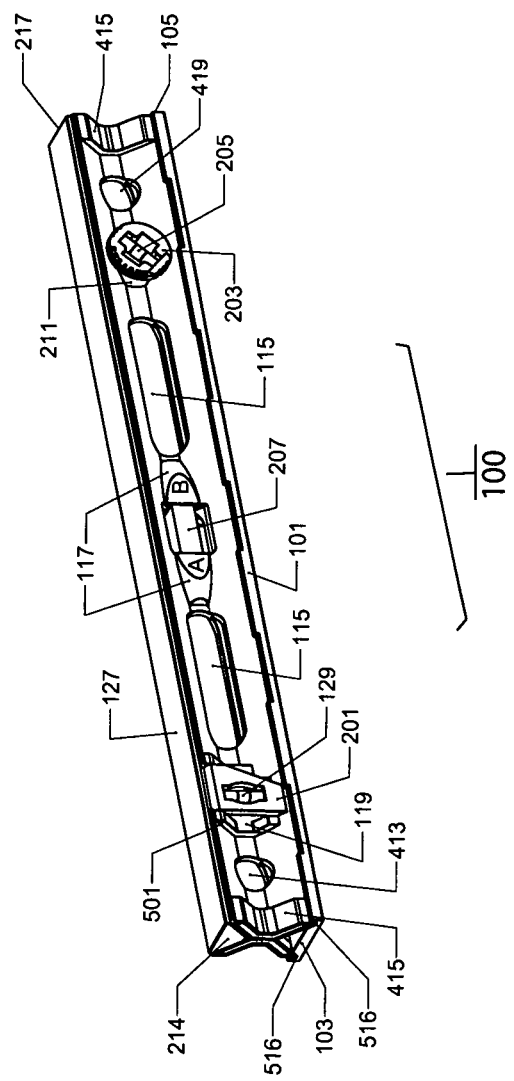

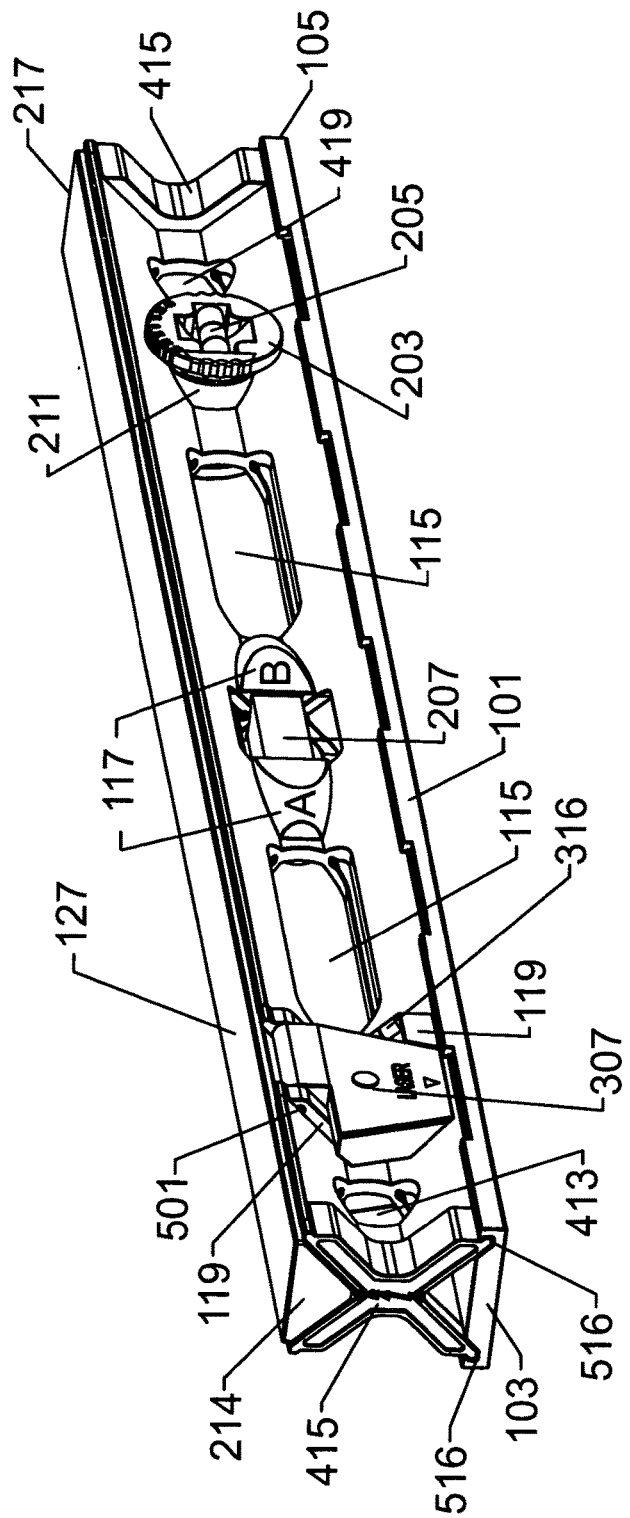
FIG#3

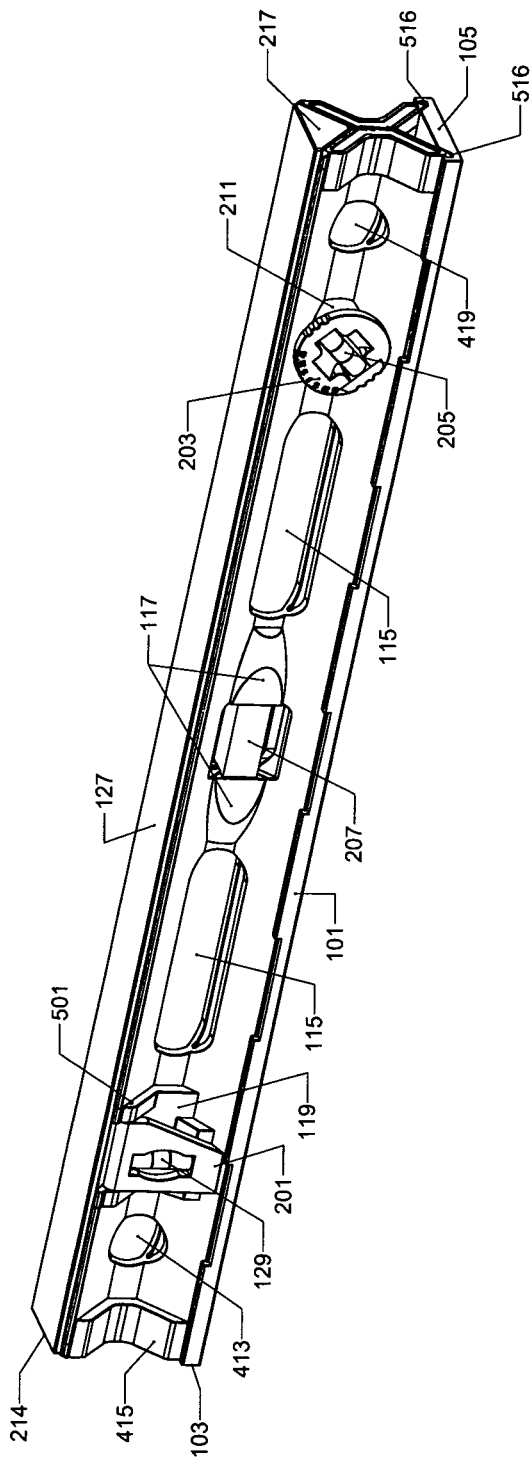
FIG#4

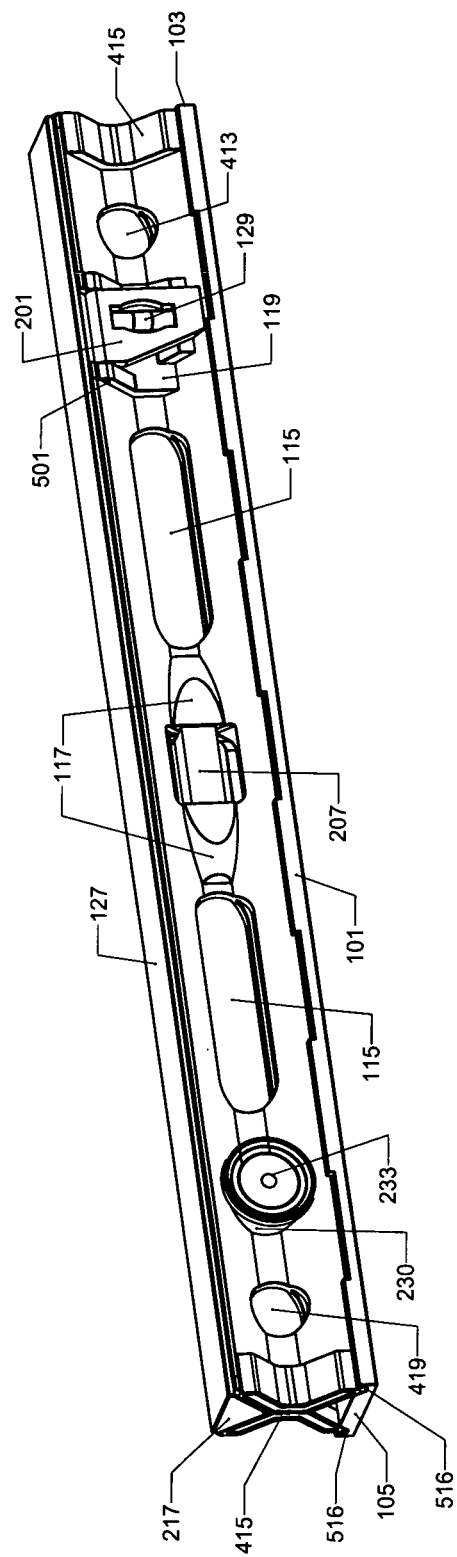
FIG#5

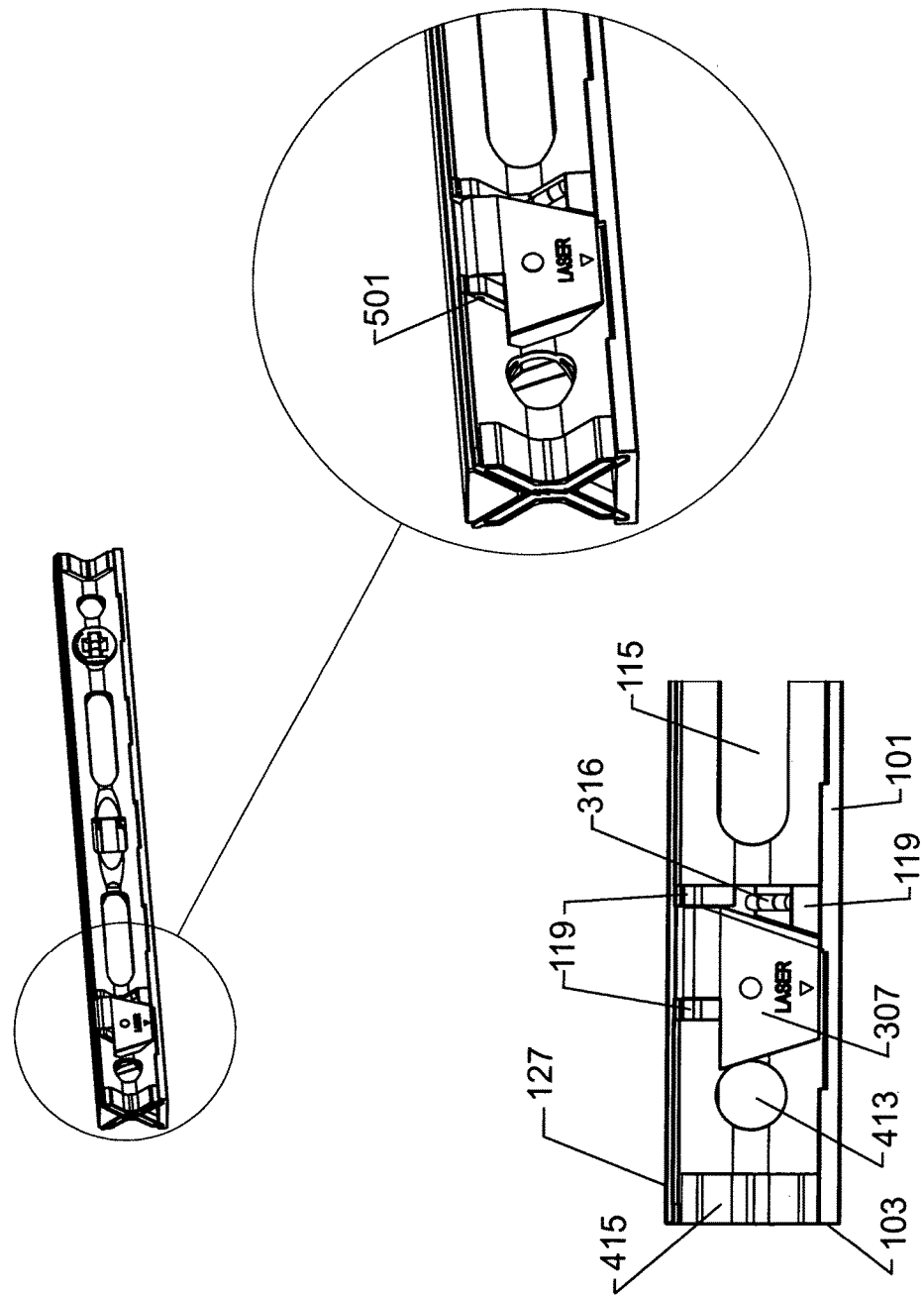

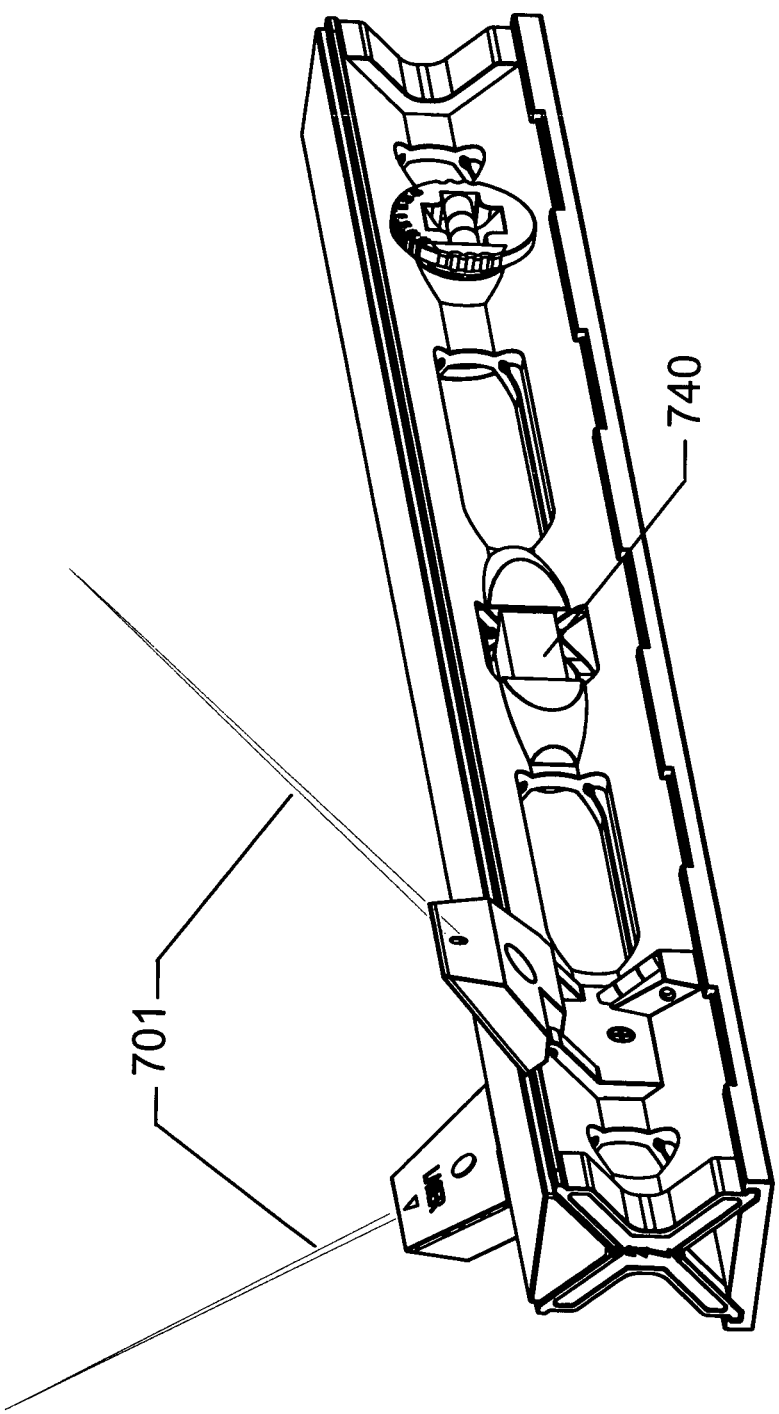

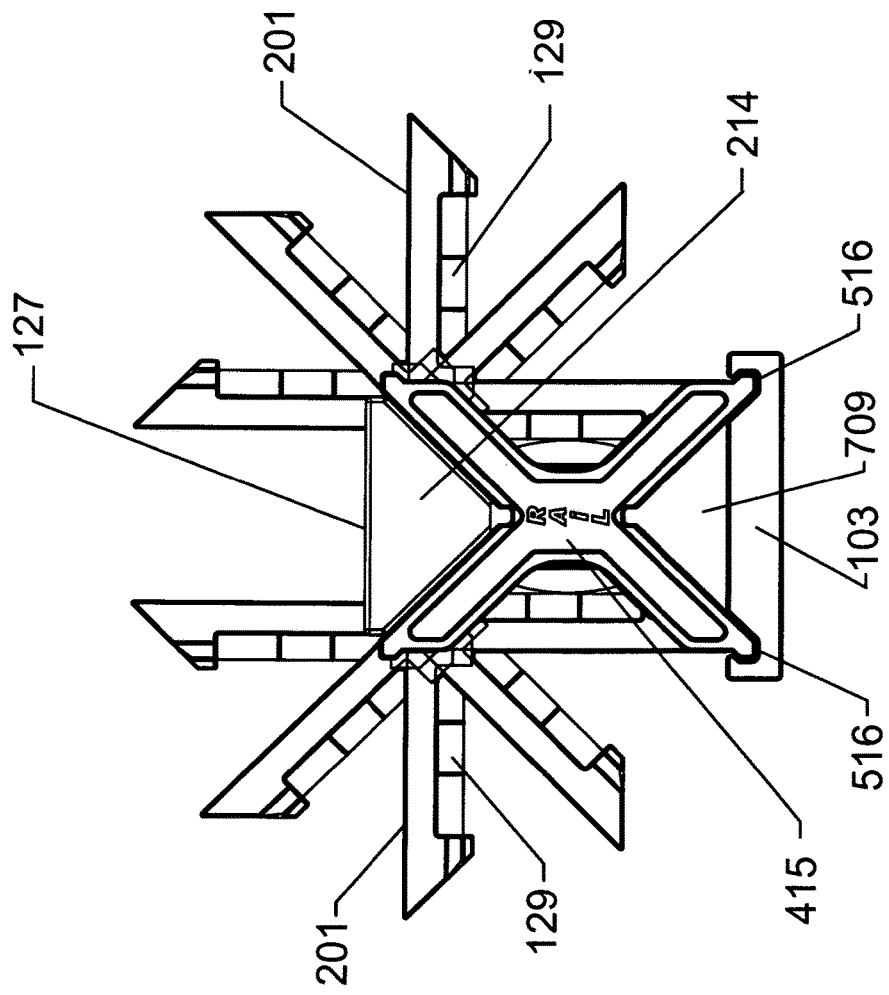

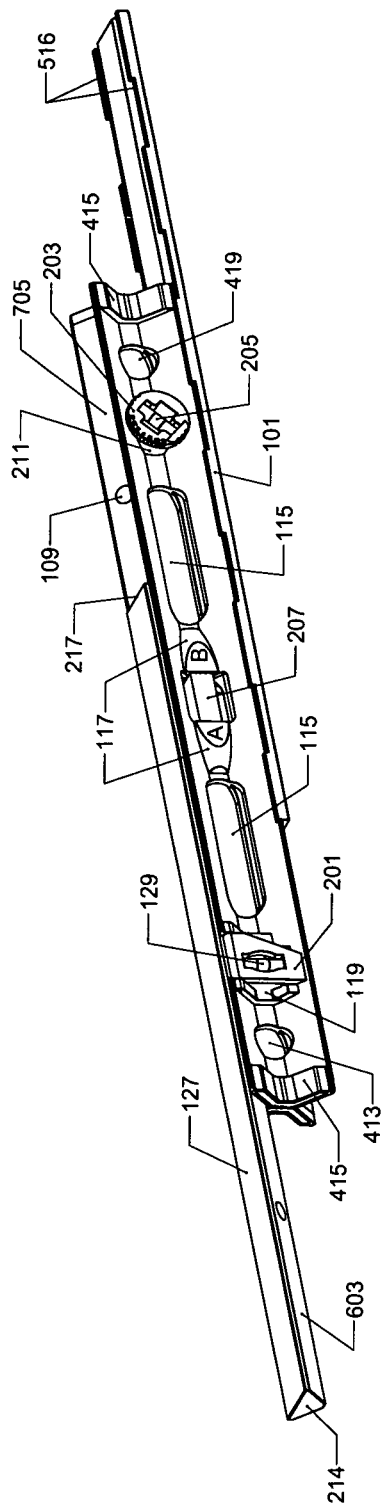
FIG#9

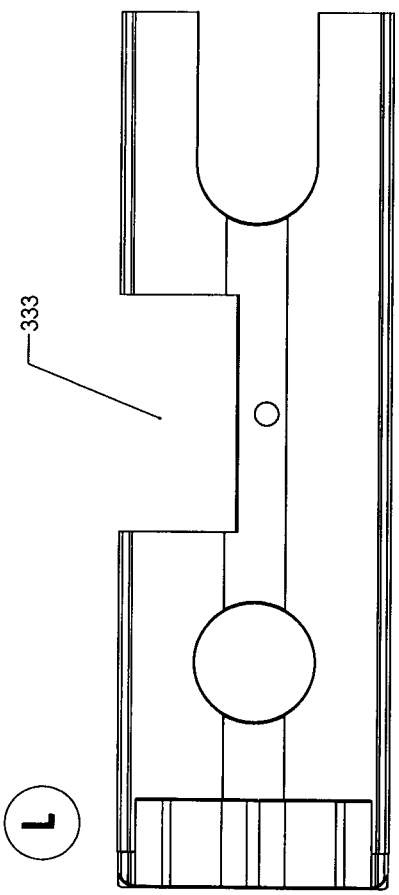
FIG#10

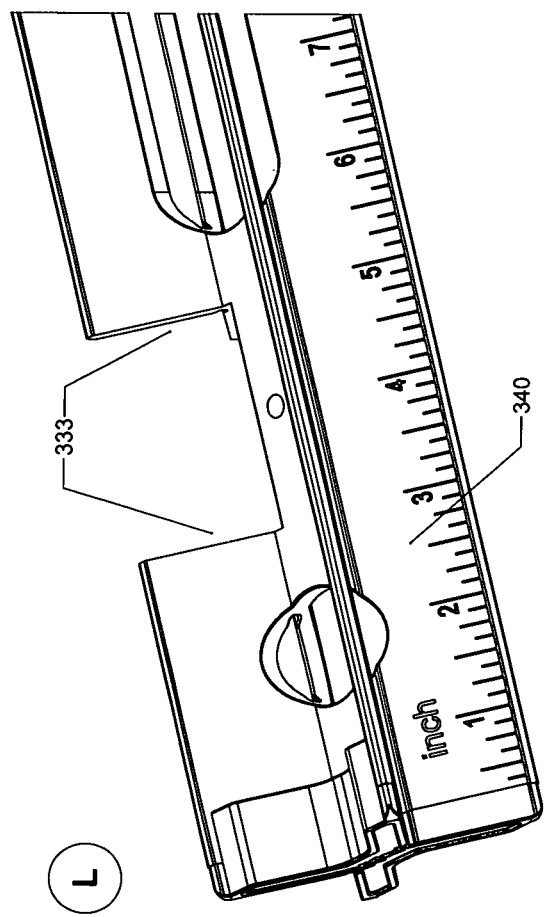

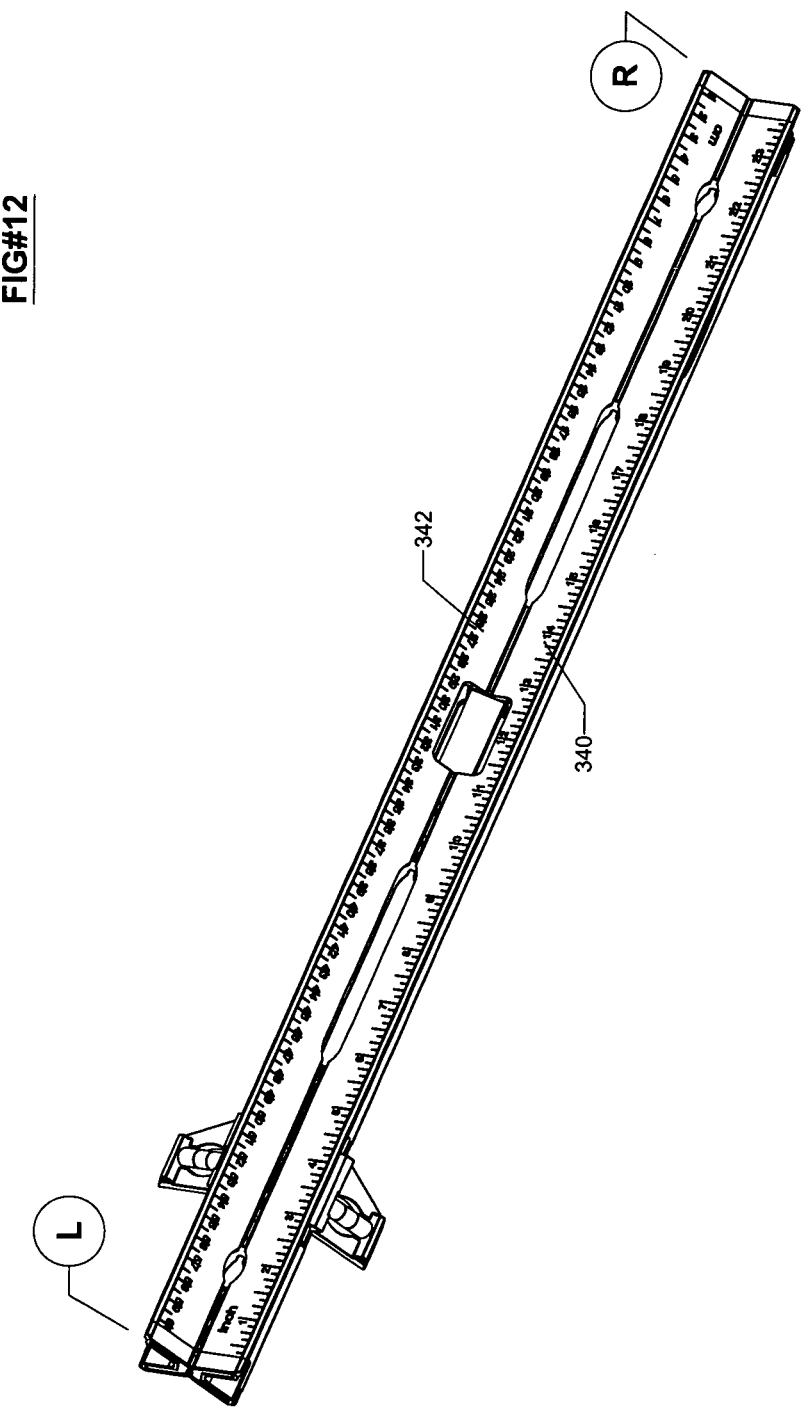

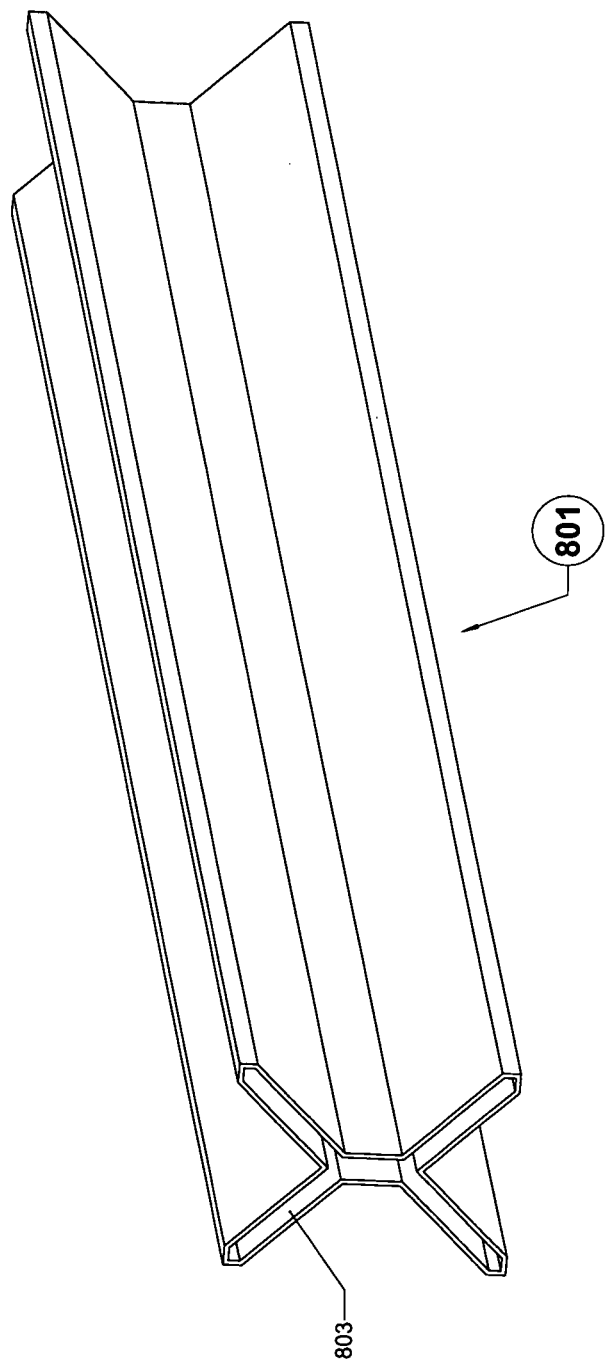

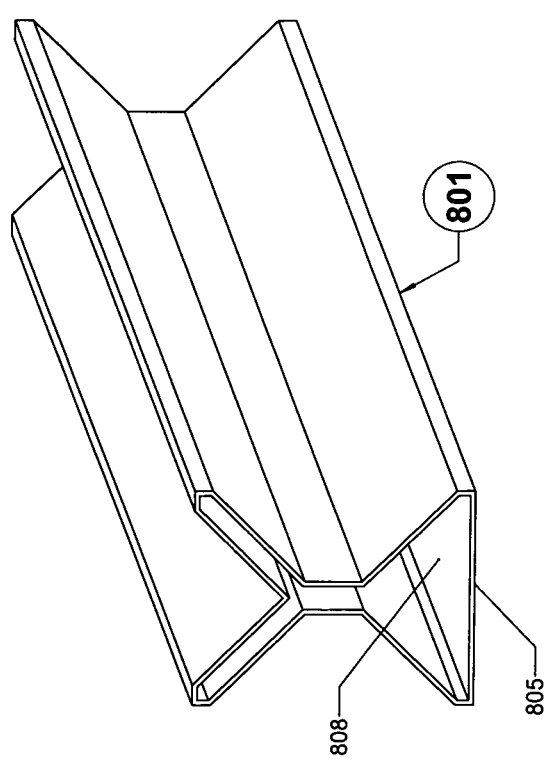

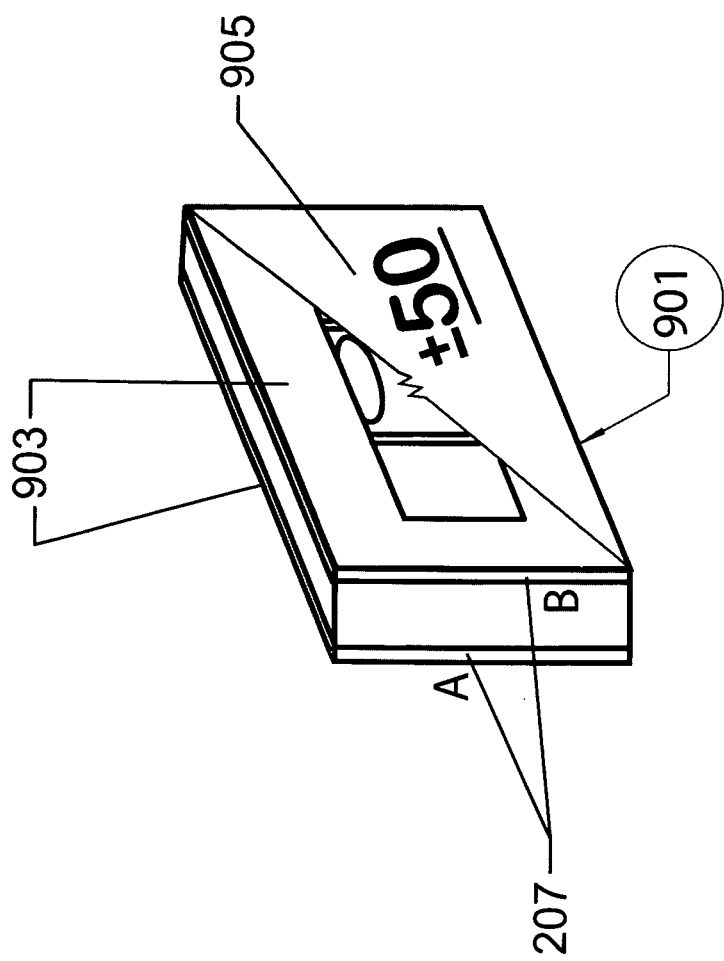

LEVEL DEVICE WITH INTERCHANGEABLE MODULES AND DIGITAL FEATURES

CROSS-REFERENCE TO RELATED APPLICATIONS

This application is a non-provisional application claiming the benefit of U.S. Application No. 61/848,563, with a priority date of Jan. 7, 2013.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present technology relates to a system and method for assuring that various elements or portions of building construction are in correct relation to one another, or to the ground upon which they are being constructed, or to related buildings.

A level is a device of measurement commonly used to assure that portions or elements of building structures, such as foundations, walls, flooring and framing, are aligned in a desired way with respect to other portions of a structure. In one aspect, a level can be used to ensure that some portion or element of a building or other structure, such as a bridge, is perpendicular to the force of gravity. Such portions include the structure's flooring, vertical walls and other load-bearing elements.

A variety of means and methods such as by the human eye, plumb measurement via stretched or weighted lengths of string, or simply gravitated water surfaces, were used to achieve a desired result. Over time and use, more technologically designed models have evolved from these simple devices in the fundamental need for truer horizontal and vertical measurement. In examples of prior art, there are examples that depict level devices with flat sides, level devices that are square, notched on one end, and level devices notched on one or two sides. Several patents, such as U.S. Pat. No. 6,918,187 to Schaefer, U.S Pat. Nos.397, 946, 238,153, and 582,517 are evolutionary examples of alternative level device designs and methods directed toward obtaining more accurate and reliable determinations of true horizontal, true vertical, and any angle in between.

Unlike the invention shown in U.S. Pat. No. 6,918,187 to Schaefer, the present invention provides numerous embodiments with respect to the many interchangeable laser, digital, and other types of modules that are part of the invention. Examples of the distinctions between the present invention and level devices of the prior art are significant. Among them are the X-frame, or modified X-frame, when combined with the many interchangeable modules, slide plates, rails and bases, includes concavities (or channels) on two or more sides with adaptations to encompass triangulated bars (or rails) nest-able or insert-able (in a slide-able manner) into one or more of those channels.

BRIEF SUMMARY OF THE INVENTION

A key objective of a reference level device of the invention is to provide the user with a multi-functional, accurate and adaptable measuring device directed toward handling many aspects of leveling, measuring and marking.

Another object of the invention is to provide practical alternatives to both complex and expensive methods and devices, as well as to provide level devices which are adaptable to many functions and many surfaces, while being embodied in a hand-held device.

Another object of the invention is to provide a basic frame of a level device with modular capability, allowing the user to choose supplemental modules best suited for his purposes.

In a significant aspect, embodiments for a wider range of level applications in the present invention meet and exceed these objectives, especially with respect to general construction and all around leveling purposes.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating.

FIG. 1 is a frontal horizontal perspective view of a preferred embodiment of the Level Device in accordance with the present invention comprising, among other elements, removable magnet bars (rails), one or more interchangeably mountable elements and modules, such as leveling vials, through holes for handling, mounting and manipulation, and one or more rotational vials for various incremental measuring and comparison systems.

FIG. 1A is a perspective view of a laser beam mechanism that can be attached modularly to the Level Device.

FIG. 2 is aside horizontal perspective length view of a preferred embodiment of the Level Device showing an X-Frame suitable for holding leveling instrumentation such as rotating bubble vials mounted on different axes.

FIG. 3 is a similar view to that in FIG. 2, and shows an Interchangeable Rotational Laser Mechanism mounted in a slot or receiver provided in the X-Frame.

FIG. 4 is a left side rear top perspective view of the embodiment shown in FIGS. 1, 2 and 3.

FIG. 5 is a right side rear top perspective view of the embodiment shown in FIGS. 1, 2, 3 and 4 with a bulls-eye liquid leveling vial.

FIG. 6 is a side frontal sectional (and close-up) view of the Level Device attached to an Interchangeable Rotational Laser Mechanism.

FIG. 7 is a close-up top rear perspective view of the embodiment shown in FIG. 6, with an Interchangeable Rotational Laser Mechanism rotated to one of many possible open configurations, and emitting laser projects, as well as a centrally located digital readout 740, and a tubular bubble vial and its base mount.

FIG. 8 is a straight-on profile-from-the-front view of an embodiment having a Bubble Vial Module, and showing the many possible angular extensions of the Bubble Vial Rotational Mechanism.

FIG. 9 is a variation of the view of FIG. 1, but with the Bar Rail shown attached to the X-Frame and slide-ably adjusted to the left, and with Skid Plate 101 shown attached to X-Frame and slide-ably adjusted to the right.

FIG. 10 is a side view of the Level Device of the invention showing Receiver Slot, which is adapted and arranged for receiving and reversibly holding, one or more modules of the invention.

FIG. 11 is a perspective view of an embodiment of Receiver Slot constructed within a portion of the X-Frame, wherein measurement marks are placed upon portions of the X-Frame.

FIG. 12 is a bottom perspective view of a preferred embodiment of Level Device of the invention, showing certain measurement marks in metric and English units.

FIG. 13 is a side oblique view of a portion of a hollowed X-Frame component of the invention.

FIG. 14 is a frontal oblique view of a Flat-Bottomed X-Shaped Hollow Frame embodiment of the invention.

FIG. 15 shows a Digital Electronic Virtual Bubble Vial to be placed in the center portion of the X-Frame.

DETAILED DESCRIPTION OF THE INVENTION

Although specific embodiments of the present invention will now be described with reference to the drawings, it should be understood that such embodiments are by way example only merely illustrative of but a small number of the many possible specific embodiments which can represent applications of the present invention. Various changes and modifications obvious to one skilled in the art the present invention pertains are deemed to be within the spirit, scope and contemplation of the present invention.

FIG. 1 illustrates a frontal horizontal perspective view of a preferred embodiment of a Channeled Level Device 100 of the invention showing certain key permutations of many elements, portions, and parts of the present invention. X-Frame 107 is a channeled frame having channels formed by frame elements which approximate a letter X, wherein the X-shape has a central elongated section or beam. As illustrated in FIG. 1, the structure of X-Frame 107 resembles two Y sections connected via the stem of the Y. The length, as referring to the length of X-Frame shall herein be defined as a measurement of length of the axis defined by the center point of a series of X shapes formed from the profile of the device.

Skid Plate 101 is adapted and arranged to be reversibly mountable to the bottom or top of an X-Frame 107 of the invention. Skid Plate 101 can be made of any suitable material, but preferably of industrial plastic, and shall be particularly suitable for slide-ably interfacing the invention with concrete, bricks, and rough surfaces. In the preferred embodiment shown, Skid Plate 101 is provided with Grooves 516 which are configured for intimate and slideable attachment to the Bottom Contact Edges 720A and 720B of X-Frame 107, forming V-Channel 709 when attached. V-Channel 709 is formed by planar walls of the structures of X-Frame 107 and Skid Plate 101.

Skid Plate 101 is provided with Front Edge 103 and Rear Edge 105. Grooves 516 and X-Frame 107 preferably mate with one another such that Skid Plate 101 and Frame 107 can slide with respect to one another in use in applications where X-Frame 107 is desired to move with respect to Plate 101. Skid Plate 101 is configurable such that it broadens the width or length of the footprint of the combined X-Frame 107 and Skid Plate 101, while also providing a variable length to the present invention for use, by way of example, on masonry, concrete walkways, bricks, cinder blocks, and building frame elements. Preferably, Bottom Surface 130 of Skid Plate 101 is in parallel planar relation with the plane defined by Bottom Contact Edges 720A and 720B of X-Frame 107. A user of the present invention may thus rely on X-Frame 107's accuracy with respect to the parallelism between it and Bottom Surface 130.

X-Frame 107 can be made of any suitable material or combination of materials, such as aluminum, plastic, composite materials, or carbon fiber, as one of ordinary skill in the measuring tool arts will comprehend. X-Frame 107 is provided with a number of key features and aspects which enable its adaptability to many uses. In one significant aspect, X-Frame 107 of Level Device 100 is provided with one or a plurality of High-Strength Magnets 109 (for example, neodymium magnets) which, in some preferred embodiments, are flush-mounted to one or more surfaces of X-Frame 107, although any mounting method which is adapted and arranged to achieve the purposes of the invention is within the spirit and concept of the invention.

High-Strength Magnets 109 are preferably positioned so that they can magnetically, and reversibly, affix or mount Level Device 100 to, for example, metallic framing elements of buildings and other structures, round piping and conduit, and ductwork. Magnets 109 can also be positioned such that they interact with other magnets and magnetically susceptible inserts or portions of other devices. As an example, magnets 109 can be positioned so that they interact adherently to other magnets, such as High-Strength Magnets 409 placed within Triangular Bar Rail 127 as described herein.

Through Apertures 115, 413, and 419 are also provided in X-Frame 107. Through Apertures 115, 413, and 419 are adapted and arranged such that they can be used as handles for carrying, holding or handling Level Device 100, or for the mounting and carriage of various types of modules, attachments or devices which can be combined with Frame 101 (such as modules mentioned elsewhere herein, or with any other part or portion of Level Device 100). Such apertures are preferably oblong oval in shape and centrally located along the median of the frame, made by way of drilling, molding or punch press manufacturing for use of hand placement to carry and hold device to work surfaces. For some or all apertures, Cushioned Linings 730 can be provided to improve user comfort while handling the device via the apertures. Some preferred embodiments of X-Frame 107 are also provided with Shock-Absorbing Protective End Caps 415, which can also be of electrically or thermally insulating materials, and made with scratch-resistant materials Center Vial Holding Brackets 117A and 117B are adapted and arranged to hold Center Vial 207 with respect to Frame 107, or to hold other elements or modules useful within a level device. Center Vial 207 may preferably comprise a rectangular acrylic block liquid-filled bubble vial. Brackets 117A and 117B can be formed into Frame 107, or added thereto as is needed for the particular embodiment desired. Brackets 117A and 117B can also be adapted and arranged to hold digital vials, for example, digital leveling vials adapted and arranged to record measurements that have been taken or observed. Such brackets are preferably made of hard plastic to accurately hold edges of centrally-mounted vials, screens, or indicators. It is within the contemplation of this invention that such brackets may hold a wide variety of instrumentation useful in a level device, such as timekeeping devices, compasses, or devices interacting with mobile phones.

In some preferred embodiments, the invention can include at least one adjustable, and reversibly mountable, Triangular Bar Rail 127, which is preferably configured and arranged such that Level Device 100 can be adapted for use with Bar Rail 127, for example, on polished, smooth or delicate surfaces such as marble countertops, polished metal, glass, and fine carpentry and cabinetry, where scratch-free contact is desired. Bar Rail 127 is adapted and arranged such that it can be slide-ably seated within Top V-Groove 705 of X-Frame 107. Preferably, Bar Rail 127 is complementary in shape to Top V-Groove 705 such that the two can slide with respect to one another and extend the footprint of the Level Device 100. If a preferred embodiment of Level Device 100 has a Top V-Groove angled at 90 degrees, Bar Rail 127 will also have surfaces that intersect at 90 degrees to thereby provide mating angles and shapes of the complementary elements.

Many embodiments of Level Device 100 are possible within the scope and spirit of the present disclosure. In some preferred embodiments, Bar Rail 127 is provided with one or a plurality of High-Strength Magnets 409 that are arranged and positioned at or near the surface of the walls of Bar Rail 127 such that the relative positions of Bar Rail 127 with respect to Surfaces 603 can be set as desired. For example, Magnets 409 can be provided at indexed positions along or near the Surfaces 603 such that they attach to one another such that portions of Level Device 100 and Bar Rail 127 overlap, but only to some extent. Bar Rail 127 can also be complementary to V-Channel 709 of X-Frame 107 and may in fact be stored in V-Channel 709 when not in use.

Both Bar Rail 127 and the inner surfaces of the Top V-Groove 705 can also be provided with one or a plurality of measuring or indexing lines, numerals and related markings. Triangulated Bar Rail 127 is provided with Front and Rear Surfaces 214. Bar Rail 127 can be formed, machined or molded using any suitable material, such as of plastic, metal or composite materials. Preferably the one or more materials from which X-Frame 107 is made offer sufficient rigidity that the several functions of the device are dependably facilitated. In an alternative embodiment, Bar Rail 127 can be manufactured also of inherently magnetic materials, such as ferrous metal, so that it can attach via Magnets 109 to X-Frame 107 onto inner surfaces of the Top V-Groove 705, without the need for Magnets 409.

X-Frame 107 of Level Device 100 may be fitted with one or a plurality of Tubular Liquid-Filled Bubble Vials 205. One such Vial 205 is shown in FIG. 1, wherein Bubble Vial 205 is shown rotate-ably mounted in Base Collar 211 by means of Vial Holder 203. Bubble Vial 205 is mounted in a way that allows full 360-degree rotation against the frame. Bubble Vial 205 and/or Base Collar 211 may be provided with angle (degree) or other indexing markings. Vial Holder 203 and Base Collar 211 are flush-mounted within the frontal Y-beam section of X-Frame 107.

Front mounted, circular rotational tubular Vial Holder 203 is preferably mounted within the 90 degree frontal Y beam section which connects the Top V-Groove 705 and Bottom V-Groove 709, of the X-Frame 107, with incremental degree and other indexing markings.

Also with respect to FIG. 1, Bubble Vial Module 119 is adapted for detachably mounting in and out of a Receiver Slot 333 (shown in other figures). Bubble Vial Module 119 is provided with Liquid-Filled Bubble Vials 129, Rotational Bubble Vial Rotational Mechanism 201, as well as Tubular Liquid-Filled Bubble Vial 205, and circular rotational tubular Vial Holder 203. Such a bubble vial module could be made of an sturdy material and are top and flush-mountable to Slot 333.

Liquid-Filled Bubble Vial 129 may be centrally-mounted on a Rotational Mechanism 201 to facilitate vertical and post-level measurement. Rotational Bubble Vial Rotational Mechanism 201 are hinged-secured to Module 119 by way of Rotational Pins 501. Rotational Pins 501 are designed to provide at least 180 degrees of movement to the rotational mechanisms they are attached to. Rotational Mechanism 201 may be in the form or shape of doors, flags, or hinged protrusions as illustrated.

Bubble Vial Module 119 is provided with Swivel Base Locking Bolt 301 for rigidly attaching Module 119 to X-Frame 107, and also with Swivel Base Locking Nut 304 for holding Bolt 301 in place. A combination of Bolt 301 and Nut 304 may attach other modules beyond Bubble Vial Module 119 onto X-Frame 107, such as Interchangeable Laser Mechanism Module 314 (discussed herein), or other modules within the contemplation of the invention.

Referring to FIG. 1A, Rotational Laser Mechanisms 307 are adapted and arranged to be reversibly and interchangeably mounted in Receiver Slot 333 (shown in other figures), and demounted from Receiver Slot 333 which is provided in Frame 107. Laser Mechanisms 307 are flush-mounted to X-Frame 107 and can swivel 180 degrees from a retracted position by way of Rotational Pins 501.

One or more Receiver Slots 333 can be provided at various positions in X-Frame 107. Although the embodiment shown in FIG. 1 shows Laser Mechanisms 307 in Receiver Slot 333 near the front end of X-Frame 107, Laser Mechanisms 307 can be located anywhere along X-Frame 107 as can be appreciated by those of skill in the art.

With respect to FIG. 1A, interchangeable Laser Mechanism Module 314 is provided with Hard-Mounted liquid Bubble Vials 316 in 90-degree relation to each other are also adapted and arranged to provide level and non-level indications, as well as angular readouts. Bubble Vials 316 provide level readings to the user while employing the laser. Module 314 is also provided with Laser Beam Projection Holes 401A and 401B as well as Rotational Pins 501 which are adapted and arranged as rotational axes for holding Rotatable Laser Mechanisms 307. Module 314 also provides for Bolt 301 and Nut 304 adapted for securely attaching Laser Mechanism Module 314 to the X-Frame 107. Rotational Pins 501 attach Laser Mechanisms 307 to Module 314.

FIG. 2 is an overall side oblique view of a preferred embodiment of Channeled Level Device 100 showing certain permutations of many elements in retracted form. Referring to FIG. 2, Bottom Skid Plate 101 and Triangulated Bar Rail 127 are shown to be fitted and attached to X-Frame 107. Bubble Vial Module 119 is shown attached to X-Frame 107 in a manner as to minimize the Level Device 100 footprint, and Rotational Bubble Vial Mechanisms 201 are shown to be in the retracted position.

FIG. 3 is an overall side oblique view similar to that shown in FIG. 2, showing Laser Mechanism Module 314 attached to X-Frame 107. Laser Mechanisms 307 is in the retracted position and attached to X-Frame 107.

FIG. 4 is an overall side oblique view from the rear of a preferred embodiment of Level Device 100 similar to that shown in FIG. 1, where Bubble Vial Module 119 is attached to the X-Frame 107.

FIG. 5 is an overall side oblique view from the rear of a preferred embodiment of Level Device 100 similar to that shown in FIG. 4, except from the opposite side. A Bull's-eye Type Liquid Leveling Vial 233 is attached to X-Frame 107 via circular Vial Base 230. Vial 233 is mounted via Vial Base 230 in a flush-mounted configuration of the opposing Y-Beam section of the X-Frame 107 for use on table tops, decks, floors to measure 360 degrees of horizontal measurement.

FIG. 6 is a side frontal sectional (and closeup) view of Laser Mechanism Module 314 having Laser Mechanisms 307 adapted and arranged to rotate about Rotational Pins 501.

FIG. 7 is a closeup top rear perspective view of the embodiment shown in FIG. 6, with a Laser Mechanism Module 314 shown with Laser Mechanisms 307 in open configuration, and emitting straight-line visible Laser Projections 701. A user can take advantage of these projections to orient the Level Device quickly.

Referring again to FIG. 7, a centrally located Digital Readout 740 is attached to the X-Frame 107. FIG. 8 is a straight-on profile-from-the-front view of an embodiment having a Bubble Vial Module 119, and showing several permutations of the many possible angular extensions of the Rotational Bubble Vial Rotational Mechanisms 201 wherein the Bubble Vials are disposed. Although only the approximate angles of 0 (retracted), 45, 90, 135, and 180 (fully extended) are illustrated, the invention encompasses a full range of motion between 0 and 180 degrees for the Rotational Mechanisms 201.

FIG. 9 illustrates the versatility of the slide-able elements of the invention. Bar Rail 127 is shown seated in V-Groove 705, and Skid Plate 101 is shown attached to X-Frame 107 via Grooves 516. The slide-able elements are both shown partially extended.

FIG. 10 is a side view of Level Device 100 of the invention showing Receiver Slot 333, which is adapted and arranged for receiving and reversibly holding, one or more modules of the invention. Numerous modules can be adapted and arranged to be reversibly mounted in Slot 333. In the embodiment shown by FIG. 10, Slot 333 is a rectangular void disposed within X-Frame 107. However, Slot 333 can be of any shape, configuration or disposition within X-Frame 107, so long as it is adapted and arranged to accept and reversibly mount one or more modules of the invention. In another aspect, more than one Slot 333 can be structured in X-Frame 107 as desired or needed.

It should be clear from one of ordinary skill in the measuring arts that Receiver Slot 333, Leveling Vial 233, and Center Vial 207 may be replaced with a limitless combination of instrumentation designed to facilitate a wide variety of uses. For example, such instrumentation, in module or other form, may include laser modules, electronic levels, distance measuring equipment, GPS modules, modules operatively linked to one another via digital means, modules connected to computers and other equipment via digital means, and real-time communications with software programs.

FIG. 11 is a perspective view of an embodiment of Receiver Slot 333 constructed within a portion of X-Frame 107, wherein portions of the X-Frame have graduated markings adapted and arranged for various measuring and marking functions. Shown are painted (or etched) standard English measurement Markings 340. FIG. 12 is a bottom perspective view of a preferred embodiment of Level Device 100 of the invention, showing Markings 340, and of metric measurement Markings 342.

In another aspect of the invention, the rigid X-Frame component of the Level Device provides multiple permutations of the invention that can be provided in one or more hollow-containing embodiments of the frame elements in order to allow for various manufacturing processes, such as the extrusion of preferred materials into a frame of the invention. Although the X-Frame can be made of any suitable material or combination of materials, aluminum, plastic, and fiberglass are particularly preferred. Examples of embodiments of the invention comprising a hollowed X-Frame are shown in FIG. 13.

With respect to FIG. 13, hollowed cavity, or void 803 can be provided within and through the total length and profile of hollow Frame Body 801, or within any portion of Body 801. Thus, while the exterior of the frame is generally X-shaped, the void or hollow within the frame could also be X-shaped, as well as any other shape which would fit within the margins of the frame. A hollow X-Frame of the invention is also advantageous in that the hollow or void provides access to the centers and other internal portions of the device, for example, to position one or more elements such as digital readouts, laser components, leveling vials or components, and any other elements or components useful in facilitating the construction or use of the invention.

In another embodiment of the invention, FIG. 14 is a frontal oblique view of Flat-Bottomed X-Shaped Hollow Frame 801 of the invention. Hollow bottom Section 808 is shown contiguous with the other hollow portions of Frame 801 and forms a flat bottom Surface 805. FIG. 14 shows also a top V-Channel as well as side channels. The hollow frame in comprising internal hollows illustrate yet additional embodiments of the invention, as well as optional surface configurations to assist in quick measurements of a variety of surface shapes and applications.

FIG. 15 shows Virtual Bubble Vial 901. As an additional advantageous aspect of some preferred embodiments of the invention, one or more digitized LED screens can be provided in or attached to an X-Frame of the invention. Such digitized screens can be adapted and arranged to accurately display readouts, such as those of "bull's-eye" vials in conventional levels. Virtual Bubble Vial 901 may comprise, as examples, one or more internal leveling sensors and related circuitry, adapted and arranged to provide numerous types of readouts, such as vertical and horizontal, as well as any other angle. One or more Vials 901 can be provided with one or more front and back panels, such as Front and Back Panels 903, and can be configured to fit into an X-Frame of the invention, for example, as a replacement for Center Vial 207 or Bull's-eye Type Liquid Leveling Vial 233.

Although the invention has been explained in relation to its preferred embodiment, it is to be understood that many other possible modifications and variations can be made without departing from the spirit and scope of the invention as herein described.

What is claimed is:

1. A modular level device, comprising:
   an elongated rigid frame extending along a length between a proximal end and a distal end about a central axis, the rigid frame having an X-shaped transverse cross-section defined by four elongate walls that extend outward from a central beam that extends along the central axis, each wall extending outward from the central beam to an outer edge, each pair of adjacent walls defining a V-shaped channel therebetween, a first plurality of openings defined in the central beam of the elongated rigid frame and configured to removably receive one or more level components therein, and at least one elongate opening in the central beam that define a handle via which a user can hold or handle the elongate rigid frame, and a slot defined in two adjacent walls and extending from the outer edge of the adjacent walls through at least a portion of the central beam;
   a plurality of interchangeable level modules removably insertable in the slot and at least a portion of said plurality of interchangeable level modules having a cross-section that allows the level module to be flush mounted to the elongated rigid frame, each level module having a hinged portion that rotates between a retracted position where the hinged portion is disposed in the V-shaped channel and one or more extended positions where the hinged portion extends at least partially out of the V-shaped channel, the hinged portion rotating about a hinge axis of the level module generally aligned with the outer edge of the wall on either side of the slot; and an elongated rail removably coupled to the elongated rigid frame, the elongated rail extending along a second length between a proximal end and a distal end thereof and having a triangular-shaped transverse cross-section that mates with the V-shaped channel, the elongated rail having three surfaces, two of which contact the adjacent walls on either side of the V-shaped channel and a third surface that extends between the adjacent walls across the V-shaped channel, the elongated rail configured to be slidably coupled within the V-shaped channel such that the elongated rail extends past the proximal or distal end of the elongated rigid frame to provide an extended footprint and measuring distance for the level device.

2. The level device of claim 1, wherein the hinged portion can swivel 180 degrees from the retracted position.

3. The level device of claim 1, wherein one of the plurality of interchangeable level modules comprises a liquid filled bubble vials in the hinged portion.

4. The level device of claim 1, wherein one of the plurality of interchangeable level modules comprises a laser in the hinged portion.

5. The level device of claim 4, where the one of the plurality of interchangeable level modules further comprises a pair of liquid bubble vials in 90 degree relation to each other.

6. The level device of claim 1, wherein at least one of the walls of the elongate rigid frame has a first plurality of magnets, and wherein at least one of the surfaces of the elongated rail has a second plurality of magnets, the elongated rail removably coupleable to the elongated rigid frame via the first and second plurality of magnets.

7. The level device of claim 6, wherein the first plurality of magnets are flush mounted on said at least one of the walls of the elongated rigid frame.

8. The level device of claim 7, wherein at least one of the first and second plurality of magnets comprises neodymium magnets.

9. The level device of claim 1, further comprising a skid plate extending along a third length between a proximal end and a distal end thereof, the skid plate having a pair of grooves that extend along its length and slidingly couple to outer edges of adjacent walls of the elongated rigid frame, the skid plate defining a planar contact surface on an opposite side of the grooves that covers the V-shaped channel between the adjacent walls, the skid plate configured to be slidably coupled to the elongated rigid frame such that the skid plate extends past the proximal or distal end of the elongated rigid frame to provide an extended footprint and measuring distance for the level device.

10. The level device of claim 1, wherein the elongated rigid frame is hollow.

11. The level device of claim 1, wherein the V-shaped channel is defined by a 90 degree angle.

12. The level device of claim 1, further comprising a circular opening in the central beam of the elongated rigid frame configured to rotatably receive a tubular liquid filled bubble vial such that the bubble vial can rotate 360 degrees relative to the elongated rigid frame about an axis of the circular opening.

13. A modular level device, comprising:

an elongated rigid frame extending along a length between a proximal end and a distal end about a central axis, the rigid frame having an X-shaped transverse cross-section defined by four elongate walls that extend outward from a central beam that extends along the central axis, each wall extending outward from the central beam to an outer edge, each pair of adjacent walls defining a V-shaped channel therebetween, a first plurality of openings defined in the central beam of the elongated rigid frame and configured to removably receive one or more level components therein, and at least one elongate opening in the central beam that define a handle via which a user can hold or handle the elongate rigid frame, and a slot defined in two adjacent walls and extending from the outer edge of the adjacent walls through at least a portion of the central beam;

a plurality of interchangeable level modules removably insertable in the slot and at least a portion of said plurality of interchangeable level modules having a cross-section that allows the level module to be flush mounted to the elongated rigid frame, each level module having a hinged portion that rotates between a retracted position where the hinged portion is disposed in the V-shaped channel and one or more extended positions where the hinged portion extends at least partially out of the V-shaped channel, the hinged portion rotating about a hinge axis of the level module generally aligned with the outer edge of the wall on either side of the slot; and a skid plate extending along a third length between a proximal end and a distal end thereof, the skid plate having a pair of grooves that extend along its length and slidingly couple to outer edges of adjacent walls of the elongated rigid frame, the skid plate defining a planar contact surface on an opposite side of the grooves that covers the V-shaped channel between the adjacent walls, the skid plate configured to be slidably coupled to the elongated rigid frame such that the skid plate extends past the proximal or distal end of the elongated rigid frame to provide an extended footprint and measuring distance for the level device.

14. The level device of claim 13, wherein the hinged portion can swivel 180 degrees from the retracted position.

15. The level device of claim 13, wherein one of the plurality of interchangeable level modules comprises a liquid filled bubble vials in the hinged portion.

16. The level device of claim 13, wherein one of the plurality of interchangeable level modules comprises a laser in the hinged portion.

17. The level device of claim 16, where the one of the plurality of interchangeable level modules further comprises a pair of liquid bubble vials in 90 degree relation to each other.

18. The level device of claim 17, wherein at least one of the walls of the elongate rigid frame has a first plurality of magnets, and wherein at least one of the surfaces of the elongated rail has a second plurality of magnets, the elongated rail removably coupleable to the elongated rigid frame via the first and second plurality of magnets.

19. The level device of claim 18, wherein the first plurality of magnets are flush mounted on said at least one of the walls of the elongated rigid frame.

20. The level device of claim 18, wherein at least one of the first and second plurality of magnets comprises neodymium magnets.

21. The level device of claim 13, further comprising an elongated rail removably coupled to the elongated rigid frame, the elongated rail extending along a second length between a proximal end and a distal end thereof and having a triangular-shaped transverse cross-section that mates with the V-shaped channel, the elongated rail having three surfaces, two of which contact the adjacent walls on either side of the V-shaped channel and a third surface that extends between the adjacent walls across the V-shaped channel, the elongated rail configured to be slidably coupled within the V-shaped channel such that the elongated rail extends past the proximal or distal end of the elongated rigid frame to provide an extended footprint and measuring distance for the level device.

22. The level device of claim 13, wherein the elongated rigid frame is hollow.

23. The level device of claim 13, wherein the V-shaped channel is defined by a 90 degree angle.

24. The level device of claim 13, wherein one of the first plurality of openings is a circular opening in the central beam of the elongated rigid frame, and one of the first plurality of level modules is a tubular liquid filled bubble vial configured to rotatably couple in the circular opening such that the bubble vial can rotate 360 degrees relative to the elongated rigid frame about an axis of the circular opening.

25. A kit for a modular level device, comprising:
an elongated rigid frame extending along a length between a proximal end and a distal end about a central axis, the rigid frame having an X-shaped transverse cross-section defined by four elongate walls that extend outward from a central beam that extends along the central axis, each wall extending outward from the central beam to an outer edge, each pair of adjacent walls defining a V-shaped channel therebetween, a first plurality of openings defined in the central beam of the elongated rigid frame and configured to removably receive one or more level components therein, and at least one elongate opening in the central beam that define a handle via which a user can hold or handle the elongate rigid frame, and a slot defined in two adjacent walls and extending from the outer edge of the adjacent walls through at least a portion of the central beam;
a first plurality of level modules removably coupleable in the first plurality of openings;
a second plurality of interchangeable level modules removably insertable in the slot and at least a portion of said second plurality of interchangeable level modules having a cross-section that allows the level module to be flush mounted to the elongated rigid frame, each of the second plurality of level modules having a hinged portion that rotates between a retracted position where the hinged portion is disposed in the V-shaped channel and one or more extended positions where the hinged portion extends at least partially out of the V-shaped channel, the hinged portion rotating about a hinge axis of the level module generally aligned with the outer edge of the wall on either side of the slot; and
an elongated rail removably coupleable to the elongated rigid frame, the elongated rail extending along a second length between a proximal end and a distal end thereof and having a triangular-shaped transverse cross-section that mates with the V-shaped channel between a pair of adjacent walls, the elongated rail having three surfaces, two of which contact said pair of adjacent walls on either side of the V-shaped channel and a third surface that extends between the adjacent walls across the V-shaped channel, the elongated rail configured to be slidably coupled within the V-shaped channel such that the elongated rail extends past the proximal or distal end of the elongated rigid frame to provide an extended footprint and measuring distance for the level device; and
a skid plate extending along a third length between a proximal end and a distal end thereof, the skid plate having a pair of grooves that extend along its length and are configured to slidingly couple to outer edges of another pair of adjacent walls of the elongated rigid frame, the skid plate defining a planar contact surface on an opposite side of the grooves that covers the V-shaped channel between the adjacent walls, the skid plate configured to be slidably coupled to the elongated rigid frame such that the skid plate extends past the proximal or distal end of the elongated rigid frame to provide an extended footprint and measuring distance for the level device.

26. The kit of claim 25, wherein one of the second plurality of interchangeable level modules comprises a liquid filled bubble vials in the hinged portion.

27. The kit of claim 25, wherein one of the second plurality of interchangeable level modules comprises a laser in the hinged portion.

28. The kit of claim 27, where the one of the second plurality of interchangeable level modules further comprises a pair of liquid bubble vials in 90 degree relation to each other.

29. The kit of claim 25, wherein at least one of the walls of the elongate rigid frame has a first plurality of magnets, and wherein at least one of the surfaces of the elongated rail has a second plurality of magnets, the elongated rail removably coupleable to the elongated rigid frame via the first and second plurality of magnets.

30. The kit of claim 29, wherein the first plurality of magnets are flush mounted on said at least one of the walls of the elongated rigid frame.

31. The kit of claim 25, wherein the elongated rigid frame is hollow.

32. The kit of claim 25, wherein the V-shaped channel is defined by a 90 degree angle.

33. The kit of claim 25, wherein one of the first plurality of openings is a circular opening in the central beam of the elongated rigid frame, and one of the first plurality of level modules is a tubular liquid filled bubble vial configured to rotatably couple in the circular opening such that the bubble vial can rotate 360 degrees relative to the elongated rigid frame about an axis of the circular opening.

* * * * *